March 4, 1969     C. W. HILL     3,430,980

SUPPORTING STAND

Filed Sept. 1, 1967

Inventor:
Charles W. Hill

John F. Coulter
Attorney

United States Patent Office 3,430,980
Patented Mar. 4, 1969

3,430,980
SUPPORTING STAND
Charles W. Hill, Arlington, Va., assignor to General
Electric Company, a corporation of New York
Filed Sept. 1, 1967, Ser. No. 665,093
U.S. Cl. 280—150.5                             8 Claims
Int. Cl. B60s 9/04

ABSTRACT OF THE DISCLOSURE

The disclosure shows a supporting stand for use with a power garden-type tool so that the tool can be operated remotely as part of an assembly.

BACKGROUND OF THE INVENTION

Field of the invention

The invention herein pertains to a supporting stand and, more particularly, to a novel and simple stand mechanism for easy attachment with a power garden-type tool so that the tool may be operated as part of an over-all assembly with the supporting stand.

Description of the prior art

Various supporting stands have been devised for use with powered equipment such as two-wheeled dump carts that may be pulled by a tractor when it is desired that the dump cart be stable after the tractor is removed. Additionally, various anti-tip constructions have been proposed for wheeled vehicles that are inherently unstable because of a tendency to roll or because only two wheels are used. Construction of these anti-tip devices or stands generally involves linkage to hold the vehicle horizontally as by dropping a pivoted bar onto the ground where it locks in place and, in effect, forms an additional leg for the vehicle. Other forms use a bail which may be snapped into a lower or holding position and then, by various linkage, snapped up and out of the way so that the vehicle is free to pivot about its wheels or roll. With the advent of interchangeable head power tools, various attachments are available for use with the main power unit to perform a multiplicity of operations. Typically, it is possible to employ hedge trimmers or grass shears for garden work with a basic power unit that may also have interchangeable heads for sawing, drilling, sanding, and other workshop functions. When a grass trimmer attachment is used with the power unit, it is desirable to have some supporting stand structure whereby the entire unit may be wheeled about by the user and may be left in a standing position when not in use but is easily transformed to roll for trimming purposes. A problem inherent in known two-wheeled supporting stands for use with portable tools such as grass trimmers and edgers is that they cannot be left in a standing position, but must be laid on their sides or tilted back to rest on the tip of the handle when not operating—either way requiring the user to bend over and pick up the device to operate it.

SUMMARY OF THE INVENTION

Briefly described, the present invention is directed to a supporting stand for use with a power unit that may be used with grass shears or edgers in order to provide a rolling assembly for convenient trimming operations. The supporting stand structure comprises a substantially horizontal base plate on which the power tool may be mounted. The base plate has opposite depending fore and aft side flanges that may be formed directly from the plate by bending them downwardly therefrom and the side flanges are provided with wheels for rolling the device about. A depending transverse rear flange is also provided, the rear flange being spaced from each side flange to define a vertical slot with the side flanges at the aft end of the base plate. A cut-out portion is provided on the inner surface of each slot substantially at the top of the slot and a cam surface is provided on each lower corner of the rear flange between the bottom of the flange and the side of the slot. A bail having a transverse bight rearwardly of the rear flange and a pair of fore and aft legs is provided with the legs extending through the slots and pivotally connected by any suitable means to the side flanges. The bail is internally spring-biased by bending so that it is biased against the inner surface of the slots when the legs are in the slots. The bail therefore rotates from an unsprung lower position where it supports the stand by abutment against the bottom of the rear flange around to a non-supporting upper position where the legs are cammed apart into the slots to move into the cut-out portions for retention in the cut-outs by the spring action of the bail. Generally, this structure is provided in a two-wheel stand which has a handle secured to the base plate and extending upwardly and rearwardly so that the entire stand is rotatable by the handle to move the bail from the lower to the upper position by rocking back against the bail. The bail may diverge rearwardly to form a wide bight for greater stability and the entire assembly is formed so that the supporting function is obtained merely by pushing the bail downwardly with the foot of the user until it snaps out of the slots and under the rear flange to support the tool.

DESCRIPTION OF THE PREFERRED EMBODIMENT

Figure 1:
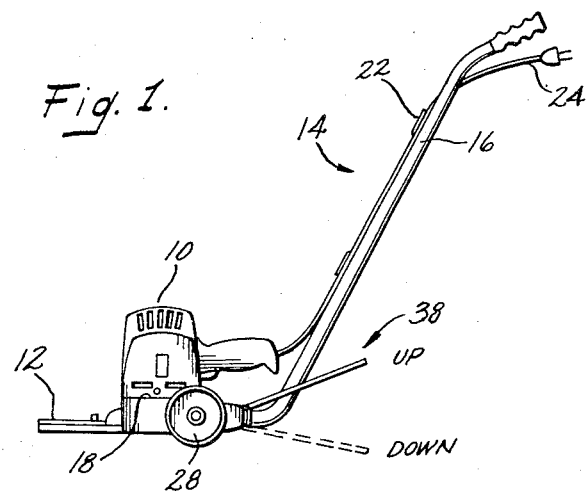
FIG. 1 is a side elevational view of the supporting stand with a tool thereon and showing the bail in two positions.

Referring first to FIG. 1 there is shown a power unit 10 which may be any kind of tool to be wheeled around for use from a stand-up position. Power unit 10 may be supplied with an interchangeable head such as grass shears 12 for trimming. In order to operate the trimmer while standing up, a supporting stand generally indicated at 14 is provided. This stand may comprise a single handle 16 of any suitable shape that is secured to a substantially horizontal base plate 18 by any suitable means such as screw 20 or its equivalent. Where an electric driven power tool is used handle 16 may have suitable cord retaining loops 22 for adjusting the length of cord 24 or storing it when not in use.

Figure 2:
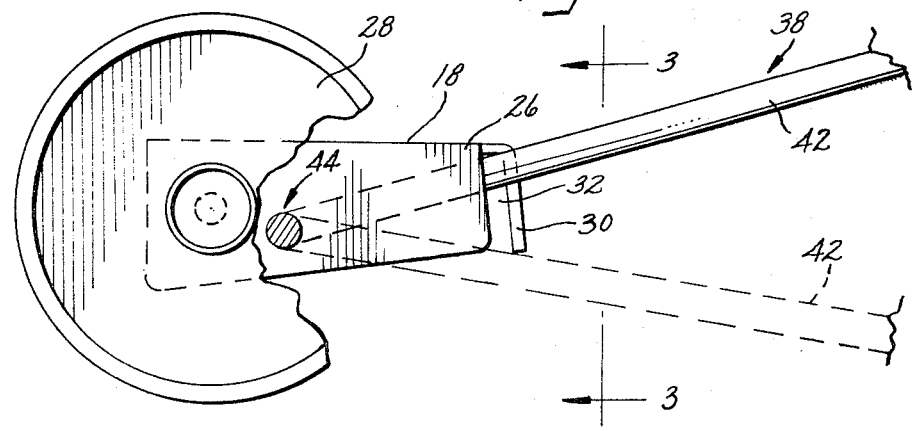
FIG. 2 is an enlarged partial view of the supporting stand structure.
Figure 3:
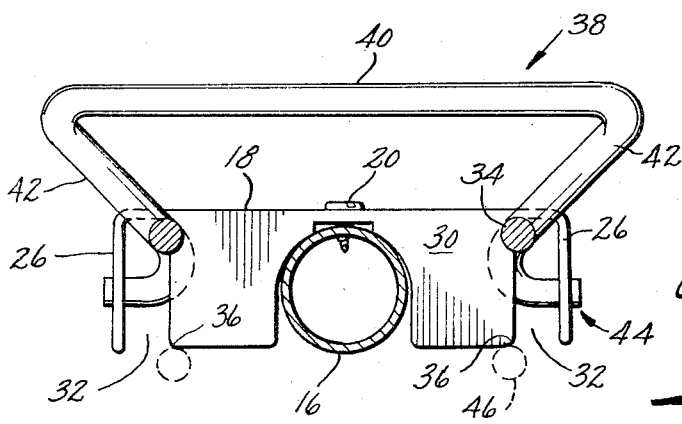
FIG. 3 is an end view looking in the direction of arrows 3—3 of FIG. 2.

Referring next to FIGS. 2 and 3, base plate 18 has opposite depending fore and aft side flanges 26 to which any size wheels 28 and preferably two may be attached by suitable means as directly to the side flanges or by an axle as desired to provide mobility to the device. The side flanges 26 may be separate pieces or, as shown, may be conveniently bent down from base plate 18 as part thereof. For cooperation with the stand structure, there is provided a depending transverse rear flange 30 which is spaced from each side flange to define a vertical slot 32 on each side as shown in FIG. 3. Additionally, the slot may be formed to provide some relief in the fore and aft direction as shown in FIG. 2 for accommodating the bail as will become apparent. Each slot is provided with a locking structure in the form of a cut-out portion 34 substantially at the top of the slot although it may be formed elsewhere on the side of the slot. The top location permits a stronger locking feature for the bail as will become apparent. At the other end of the slot on each lower corner of the rear flange there is provided a cam surface 36 which may take the form of rounding off of the corner.

In order to provide support for the assembly described, a bail generally indicated at 38 is provided. The bail has a transverse bight 40 rearwardly of rear flange 30 and a pair of fore and aft legs 42 that extend through slots 32 and are pivotally connected by any suitable means as a simple reverse bend and aperture in the side flanges 26 as generally indicated at 44. Thus, the bail is rotatable between an upper non-supporting and lower supporting position as shown in solid and dotted lines respectively in FIGS. 1 and 2.

To keep the structure as simple and inexpensive as possible and avoil locking linkage, the bail 38 is biased inwardly against the inner edges of slots 32. This is obtained by bending or springing the bail so that it is internally spring-biased against both slot sides. Thus, in the upper or solid position, as shown in FIG. 3, it will be apparent that the bail springs into the cut-out portions 34 in the slots and, because of the built-in bias, is retained in the slots to lock it in the upper position. When it is desired to move the bail into lower stand-supporting position, a kick of the user's foot snaps the bail out of the cut-out portions 34 where it pivots down the slots to snap into the unsprung stand-supporting position as shown dotted at 46 where the fore and aft legs spring somewhat together to rest on the bottom of transverse flange 30 and support the entire assembly. Rocking the entire device by means of handle 16 about wheels 28 permits the bail to be cammed around surface 36 and back up into the slots. Sufficient movement of the handle rides the bail into the cut-out portions 34 where it is again locked in the non-supporting position. Thus, the spring effect of the bail locks it firmly in both positions so that a dual function is achieved. Also, the bail is easily and quickly released from either position.

By having the legs of the bail diverge rearwardly to form a bight 40 that is wider than plate 18, several advantages are obtained. The wide bail provides greater stability against tipping of the entire assembly, a stronger built-in spring effect is obtained, the locking in the upper position is improved by the location of the legs 42 against the bottom of plate 18 and, the fore and aft off-set of the slots 32 accommodates the diverging legs 42 more firmly.

It will be apparent that the entire supporting stand assembly is simply constructed with very little fabrication requiring only a few bending and punching operations. The bight may be easily brought into supporting position by pushing it down until it snaps into position under flange 30. Inactivating the stand is simple by rocking about wheels 28 with a minimum force because of the large moment arm available through handle 16 resulting in a complete one hand operation to deactivate the stand and a one foot operation to activate it. While there has been described a preferred form of the invention, obvious equivalent variations are possible in light of the above teachings. It is therefore to be understood that the invention may be practiced otherwise than as specifically described.

I claim:
1. A supporting stand comprising:
   a substantially horizontal base plate having opposite depending fore and aft side flanges with wheels thereon and a depending transverse rear flange,
      said rear flange being spaced from each side flange to define a vertical slot therewith,
   a cut-out portion on the inner surface of each slot substantially at the top thereof,
   a cam surface on each lower corner of the rear flange,
   a bail having a transverse bight rearwardly of said rear flange and a pair of fore and aft legs extending through said slots and pivotally connected to said side flanges,
      said bail being internally spring-biased against the inner surface of said slots whereby said bail rotates from an unsprung lower stand-supporting position against the bottom of the rear flange to cam its legs apart into said slots upwardly into said cut-out portions for biased retention therein.

2. Apparatus as described in claim 1 wherein said flanges are integral with said plate and are bent downwardly therefrom.

3. Apparatus as described in claim 1 wherein the legs of said bail diverge rearwardly to form a bight wider than said plate.

4. Apparatus as described in claim 1 wherein said flanges are integral with said plate and are bent downwardly therefrom and the legs of said bail diverge rearwardly to form a bight wider than said plate.

5. Apparatus as described in claim 1 forming a two-wheel stand and including a handle secured to the base plate and extending upwardly and rearwardly therefrom and means on said plate for supporting a tool thereon, said stand being rotatable by said handle to move said bail from said lower to upper position.

6. Apparatus as described in claim 5 wherein said flanges are integral with said plate and are bent downwardly therefrom.

7. Apparatus as described in claim 5 wherein the legs of said bail diverge rearwardly to form a bight wider than said plate.

8. Apparatus as described in claim 7 wherein said flanges are integral with said plate and are bent downwardly therefrom.

References Cited

UNITED STATES PATENTS 2,207,812 7/1940 McClellan.
2,469,909 5/1949 Wickman.
2,867,449 1/1959 Shawer.

LEO FRIAGLIA, *Primary Examiner.*

ROBERT R. SONG, *Assistant Examiner.*